United States Patent [19]

Todd

[11] Patent Number: 5,101,850
[45] Date of Patent: Apr. 7, 1992

[54] FILTER CHANGE LIQUID SHUTOFF SAFETY INTERLOCK DEVICE

[75] Inventor: John A. Todd, Berlin, Md.

[73] Assignee: Dresser Industries, Inc., Dallas, Tex.

[21] Appl. No.: 430,551

[22] Filed: Nov. 1, 1989

Related U.S. Application Data

[63] Continuation-in-part of Ser. No. 410,131, Sep. 21, 1989, abandoned.

[51] Int. Cl.⁵ .................... F16K 43/00; F16K 31/44; F16K 51/00
[52] U.S. Cl. .................... 137/15; 137/315; 137/544; 210/234; 251/74; 251/76
[58] Field of Search .............. 137/15, 315, 544, 547; 251/74, 76; 210/232, 234, 235, 435, 446, 447

[56] References Cited

U.S. PATENT DOCUMENTS

| | | | |
|---|---|---|---|
| 1,220,231 | 3/1917 | Jack | 137/544 |
| 1,242,854 | 10/1917 | Peter | 137/544 |
| 1,746,274 | 2/1930 | Otis, Jr. | 210/234 |
| 1,746,336 | 2/1930 | Breer | 210/234 |
| 1,782,702 | 11/1930 | Wheeler | 210/234 |
| 2,728,460 | 12/1955 | Collis et al. | 210/234 |
| 2,991,885 | 7/1961 | Gutowski | 210/234 |
| 3,385,475 | 5/1968 | Loe | 222/83.5 |
| 3,399,776 | 9/1968 | Knuth | 210/234 |
| 3,591,007 | 7/1971 | Crowther | 210/234 |
| 3,608,726 | 9/1971 | Crowther | 210/234 |
| 4,055,500 | 10/1977 | Parker | 251/76 |
| 4,379,053 | 4/1983 | Brane | 210/234 |
| 4,529,514 | 7/1985 | Gruett | 210/234 |
| 4,818,397 | 4/1989 | Joy | 210/232 |

Primary Examiner—George L. Walton

[57] ABSTRACT

A liquid shutoff safety interlock device is provided which ensures that fluid flow to a filter is stopped prior to filter removal without requiring the use of a complex and expensive filter valve assembly and without requiring any substantial modification of existing components. The invention is particularly, though not exclusively, adapted to fuel dispensing equipment supplied by a remote pump and installed with a filter above and an impact valve below each fluid supply inlet. The liquid shutoff safety device of the present invention is placed between the impact valve and the filter so that in one position the device blocks access to the end of the filter and in another position provides filter access while at the same time tripping the latch arm to close the impact valve.

17 Claims, 5 Drawing Sheets

FILTER CHANGE LIQUID SHUTOFF SAFETY INTERLOCK DEVICE

CROSS-REFERENCE TO RELATED APPLICATIONS

This application is a continuation in part of copending U.S. patent application Ser. No. 07/410,131, filed Sept. 21, 1989, having the same title and inventor as the present application, now abandoned.

BACKGROUND OF THE INVENTION

This invention relates to fuel dispensing systems and, more particularly, it concerns a liquid shutoff safety device for use with a filter and impact valve arrangement in a remote pump type fuel dispensing system.

Figure 1:
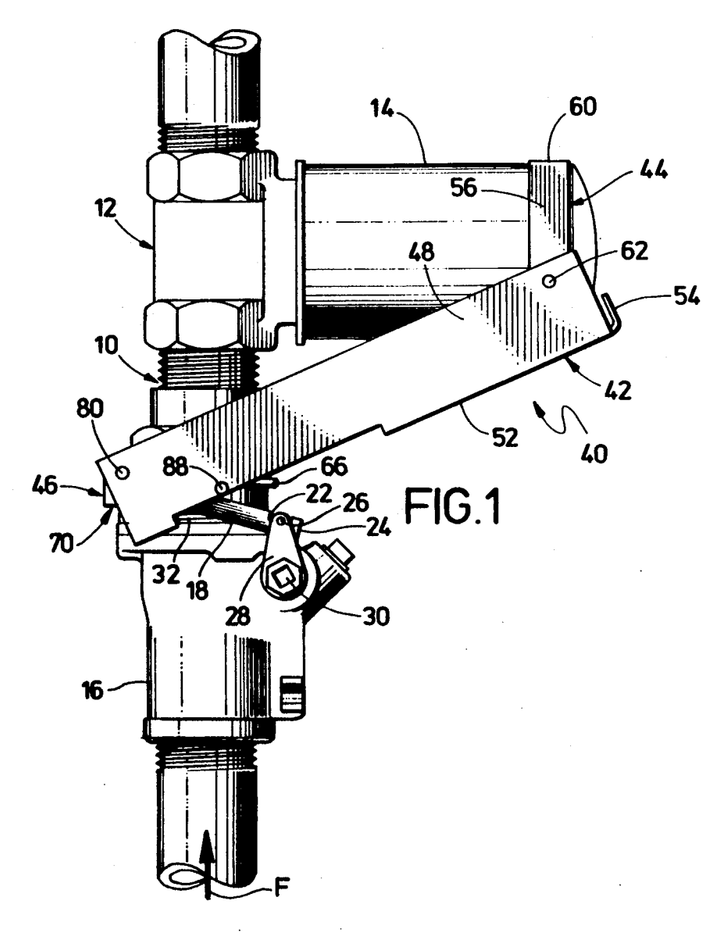

As is well known in the fuel dispensing art and as shown, for example, in FIG. 1 of the drawings, each fuel inlet 10 of a conventional remote pump type fuel dispenser usually has mounted thereabove a fuel filtering assembly 12 including, for example, a horizontally oriented, disposable filter 14, for removing suspended particles from the incoming fuel F supplied to the dispenser by, for example, a sump pump in a large supply tank. The filters 14 need to be replaced on a regular basis in order to facilitate proper filtering and to maximize fuel flow rate. Since the filters are changed regularly and since the liquids being dispensed are hazardous, it is important to prevent fluid flow from the filter attachment point during filter replacement not only from the standpoint of system operator safety, but also out of concern for the environment.

The fuel dispenser is customarily installed at a dispensing site with an impact valve 16 (FIG. 1) located below each supply inlet 10. The impact valve 16 is of conventional design and incorporates an internal spring which biases the valve closed to stop the flow of fuel to the dispenser in case of an emergency. In particular, the impact valve 16 includes a releasable latching arrangement made up in part by a latch arm 18 having one end pivotally attached to the upper neck of the impact valve by a bolt 20 (FIG. 3) and including a rectangular notch 22 near the other free end 24. The notch 22 cooperates with a stud 26 extending from a valve actuating arm 28 which is mounted in a conventional fashion so as to rotate along with a rectangular valve shaft 30.

When the stud 26 of the value actuating arm 28 is seated in the notch 22 of the latch arm 18 as shown in FIG. 1, the impact valve is held open against the bias of the internal spring. If, however, the latch arm is tripped, that is if the latch arm 18 is moved down away from the stud 26 of the valve actuating arm 28 (FIG. 3), then the stud 26 is freed from the notch 22 and the valve actuating arm 28 and valve shaft 30 are allowed to rotate in a clockwise direction under the bias of the internal spring and the impact valve closes.

The latch arm 18 can be manually tripped, for example, by a system operator in order to stop the flow of fluid to the filter 14 prior to removal of the filter during filter replacement. Even though the remote pump, for instance, a sump pump in a fuel storage tank of the fuel dispensing system may be turned off, it is customary practice to close the impact valve 16 prior to removal of the filter 14 to make sure that fluid flow to the filter attachment point is stopped and, thereby, reduce the chances of undesirable or inadvertent leakage of fluid from the system.

Alternatively, the latch arm 18 may be automatically tripped, for example, if the fuel dispenser were to receive a shock or blow, such as if it were struck by an automobile. Additionally, the conventional impact valve 16 includes an annular, v-shaped notch 32 which serves as a shear point if, for example, the fuel dispenser were to be impacted severely and knocked over. The shear notch 32 is located between the latch arm pivot 20 (FIG. 3) and the valve shaft 30 so that in the event that the impact valve is sheared in two the latch arm 18 would be pulled away from the stud 26 of the valve actuating arm 28 and, as such, allow the impact valve to close.

As disclosed, for example, in U.S. Pat. No. 4,818,397 issued on Apr. 4, 1909, complicated liquid shutoff valve arrangements have been developed for automatically stopping fluid flow to a filter upon filter removal in an effort to reduce leakage during filter replacement by not having to rely upon a system operator to manually close a valve prior to removing the filter. Such complicated valve arrangements increase unit cost and are subject to failure due to an increase in the number of moving parts.

In light of the foregoing, there exists a need for an improved liquid shutoff device which will ensure that the fluid flow to a filter is automatically stopped prior to filter removal.

SUMMARY OF THE INVENTION

In accordance with the present invention, a liquid shutoff safety interlock device is provided which ensures that fluid flow to a filter is stopped prior to filter removal without requiring the use of a complex and expensive filter valve assembly and without requiring any substantial modification of existing components.

The invention is particularly, though not exclusively, adapted to fuel dispensing equipment supplied by a remote pump and installed with a filter above and an impact valve below each fluid supply inlet. The liquid shutoff safety device of the present invention is placed between the impact valve and the filter so that in one position the device blocks access to the end of the filter and in another position provides filter access while at the same time tripping the latch arm to close the impact valve. In the filter access blocking position, the present device attaches to the filter and physically obstructs access to the filter which prevents, for example, application of a strap wrench used to remove the filter. In this same filter access blocking position, the safety device of the present invention provides adequate room for the latch arm to latch the impact valve in an open position.

When the device is moved to provide access to the end of the filter in order, for example, to replace the filter, the latch arm is tripped and the impact valve closes. Further, with the device of the present invention in a filter accessing position, movement of the latch arm is restricted in a manner which prevents latching the impact valve open. Thus, until the filter is replaced and the device is moved back up to the filter access blocking position, the latch arm cannot be used to latch the impact valve open.

In a preferred embodiment, the present liquid shutoff safety interlock device includes a tray and filter attachment element for obstructing access to at least the base of the filter, a tray supporting bracket assembly for attaching the tray to the impact valve while providing for tray rotation, and a trip pin associated with the tray for tripping the latch arm when the tray is moved from a filter access blocking position to a filter accessing and removal position.

Accordingly, a principal object of the present invention is to provide an easily installed and virtually automatic liquid shutoff safety interlock device which ensures that fluid flow to a filter is stopped prior to filter removal. Another and more specific object of the present invention is the provision of a safety interlock device which is adapted for placement between an impact valve and filter of a conventional remote pump type fuel dispensing system with the only modification of existing structure being the shortening of the impact valve latch arm so that it will not catch on the valve shaft. Other objects and further scope of applicability of the present invention will become apparent from the detailed description to follow taken in conjunction with the accompanying drawings in which like parts are designated by like reference characters.

BRIEF DESCRIPTION OF THE DRAWINGS

FIG. is a side elevation illustrating a first embodiment of the safety interlock device of the present invention in a filter access blocking position.

DESCRIPTION OF THE PREFERRED EMBODIMENTS

Figure 2:
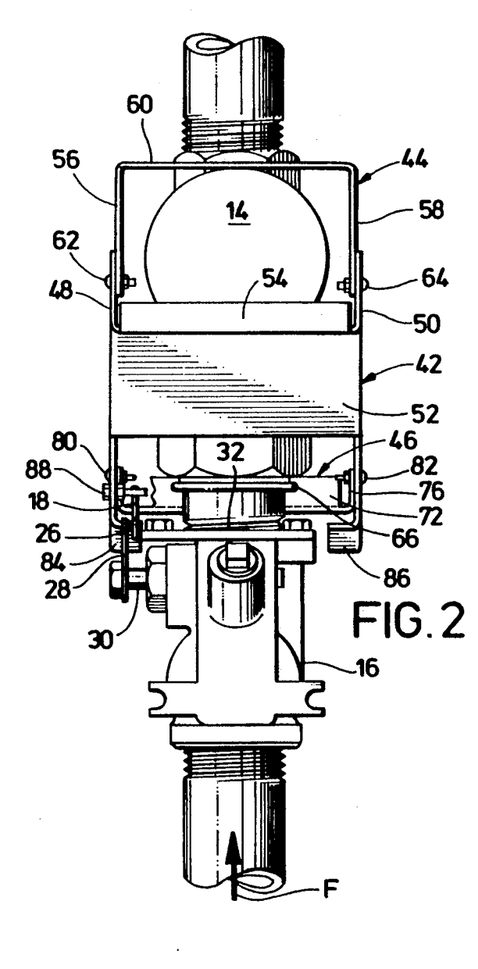
FIG. 2 is a fragmentary front elevation of the safety interlock device of FIG. 1.
Figure 3:
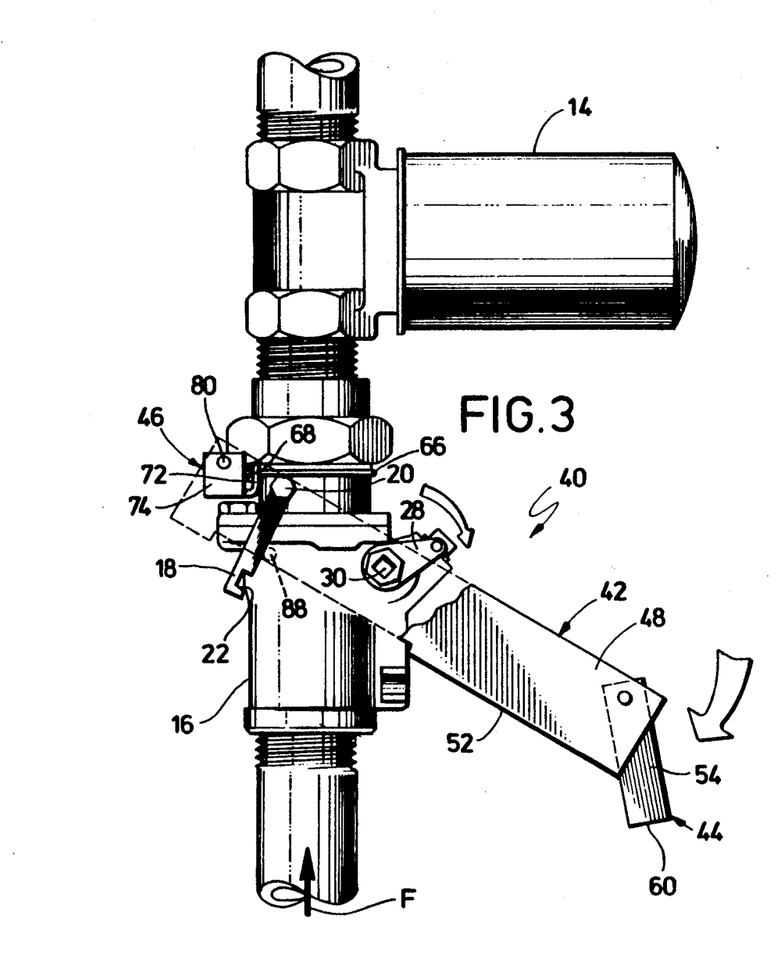
FIG. 3 is a side elevation representing the safety interlock device of FIG. 1 in a filter accessing position.

In FIGS. 1-3 of the drawings, a first embodiment of the safety interlock device of the present invention is generally designated by the reference numeral 40 and shown to include as major components a tray 42 pivotally connected at one end to a filter attachment member 44 and pivotally attached at the other end to a supporting bracket assembly 46. The tray 42 includes a pair of opposing side walls 48 and 50 which are partially interconnected by a web 52. A portion of the web 52 extends beyond the sidewalls and is upturned to form a front wall 54. The sidewalls 48 and 50, web 52 and front wall 54 define therebetween a generally rectangular recess which receives a portion of the filter 14.

The filter attachment element 44 includes a pair of opposing side sections 56 and 58 which are connected by a common top section 60 so as to form an inverted u-shape member which fits over the end of the filter 14. The filter attachment member 44 is loosely connected to the tray 42 by, for example, a pair of nut and screw assemblies 62 and 64 in order to provide for rotation of the attachment member 44 relative to the tray 42.

The tray supporting bracket assembly 46 is made up of a u-bolt 66, a pair of lock nuts 68, and a bracket 70. The bracket 70 has a front wall 72, a pair of opposing side walls 74 and 76, and a common web 78 interconnecting the front and side walls. The tray 42 is loosely connected to the bracket 70 by, for example, a pair of nut and screw assemblies 80 and 82 to allow for rotation of the tray 42 relative to the bracket 70.

The lower, rear edge of each of the sidewalls 48 and 50 of the tray 42 has extending therefrom an inwardly directed flange or tab 84 and 86, respectively. The flange 84 serves as a stop for limiting the travel of the latch arm 18 when the latch arm 18 is disengaged from the valve actuating arm 28.

As shown in FIGS. 1 and 2 of the drawings, a trip pin 88 made up, for example, of a nut and bolt is tightly secured in an opening in the sidewall 48 of the tray 42. The location of the trip pin or screw 88 is selected so that the trip pin 88 is just above the latch arm 18 of the impact valve 16 when the top section 60 of the filter attachment member 44 is slipped over and resting on top of the filter 14 (FIG. 1).

With particular reference to FIG. 2 of the drawings, the length of the trip pin 88 is sufficient to ensure that the pin will strike and dislodge the latch arm 18 when the tray is moved from the filter access blocking position of FIG. 1 to the filter accessing or removal position of FIG. 3.

In accordance with the preferred embodiment of the safety interlock device 40, the tray 42 is formed of #13 gauge steel while the attachment member 44 and bracket 70 are made from #16 gauge steel. The heavier gauge of the tray provides for sufficient weight to ensure that the trip pin 88 trips the latch arm and to ensure that the tray is rigid enough to withstand years of use and dynamic loads such as are encountered when the web 52 of the tray 42 contacts the filter 14 or the impact valve 16.

An exemplary parts list for the safety interlock device 40 is as follows:

| | |
|---|---|
| Bracket | 1 |
| Tray-Horizontal Filter | 1 |
| Attachment Member | 1 |
| U-Bolt | 1 |
| Tensilok Nut #10-32 | 2 |
| PH.P.H. Screw #8-32 × ½ | 4 |
| H.H.C.S. #8-32 × ½ | 1 |
| Hex Nut #8-32 | 5 |

Installation of the device 40 of the present invention given the above parts list entails grinding or sawing off the end 24 of the impact valve latch arm 18 approximately ¼ inch so that the end of the latch arm will not catch on the valve shaft 30, attaching the bracket 70 to the upper neck of the impact valve 16 using the u-bolt 66 and nuts 68, tightly securing the trip pin or screw 88 to the tray 42, loosely fastening the attachment member 44 to the tray 42, loosely attaching the tray 42 to the bracket 70, raising the tray 42 and positioning the attachment member 44 over the end of the filter 14, and then latching the impact valve in the open position (FIG. 1). The end of the latch arm 18 is shortened so that when the latch arm is disengaged from the valve actuating arm 28 by the trip pin 88, the end of the latch arm 18 does not catch on the valve shaft 30. This ensures that the latch arm 18 does not support the weight of the tray 42 while the tray 42 is in the filter accessing position (FIG. 3).

In the filter access blocking or filter covering position shown in FIGS. 1 and 2, the tray 42 and attachment member 44 prevent removal of the filter 14 and the raised position of the trip pin 88 allows the impact valve to be latched open. As such this is the customary operating position of the safety device during normal fuel dispenser operation. When, however, it becomes necessary to replace the filter 14 then the tray 42 will have to be moved to the filter accessing position shown in FIG. 3 so that an operator can apply, for example, a strap wrench to the filter 14. Movement of the tray 42 from the position shown in FIGS. 1 and 2 to that shown in FIG. 3 merely requires that the system operator slip the attachment member 44 off the end of the filter 14 and allow the tray 42 to rotate in a clockwise direction until the web 52 contacts the lower portion of the impact valve 16.

As shown in FIG. 3 of the drawings, with the tray 42 lowered away from the filter 14, the system operator has full access to the filter 14 and, hence, can easily remove and replace it. Also, when the tray is in this lowered filter accessing position, the trip pin 88 prevents movement of the latch arm 18 necessary to latch the impact valve open. When the filter 14 is removed from the fuel dispenser, there is nothing for the attachment member 44 to rest upon to hold the tray 42 up in a raised position. As such, the safety interlock device 40 adds an extra increment of safety in that not only does it automatically trip the latch arm 18 and, thereby, close the impact valve 16 when the tray 42 is lowered, but also it prevents resetting or latching of the impact valve 16 until the filter is replaced and in proper position on the filter assembly 12.

With regard to the second, third and fourth embodiments of the safety interlock device of the present invention shown respectively in FIGS. 4-5, FIGS. 6-8, and FIGS. 9-10, the reference characters for like parts shown in FIGS. 1-3 have been increased in number by 100, 200, and 300 respectively and only those parts which differ in construction will be described in some detail.

Figure 4:
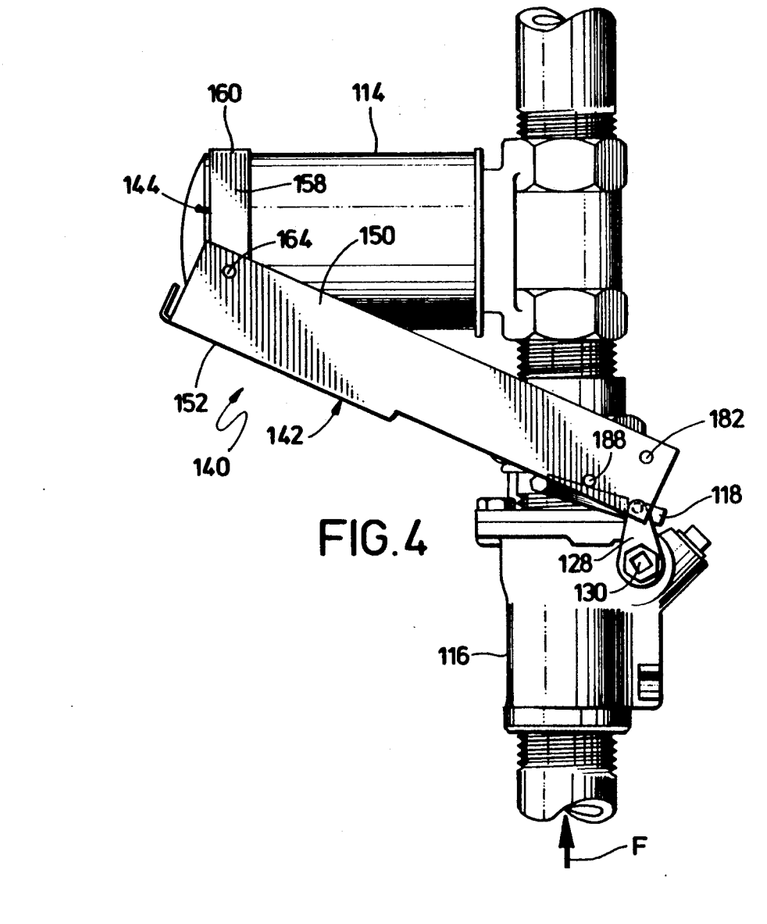
FIG. 4 is a side elevation illustrating a second embodiment of the safety interlock device of the present invention in a filter access blocking position.
Figure 5:
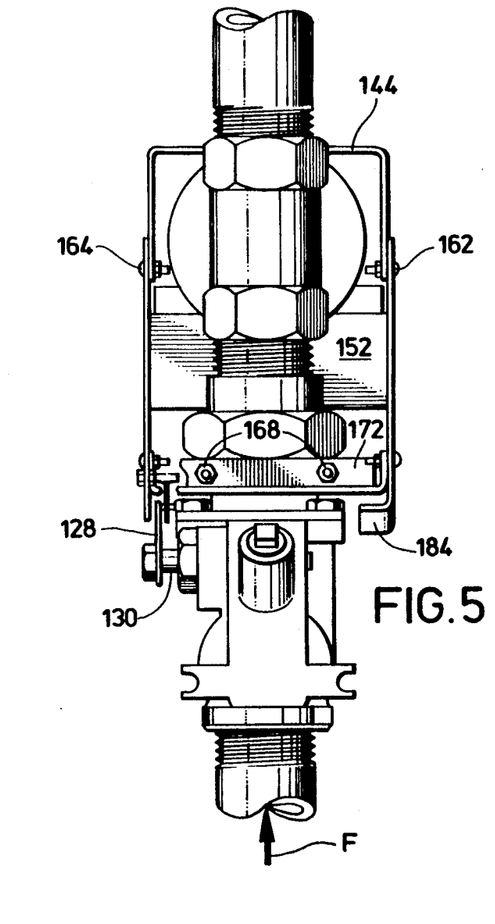
FIG. 5 is a fragmentary rear elevation of the safety interlock device of FIG. 4.

As shown in FIGS. 4 and 5 of the drawings, a second embodiment of the safety interlock device of the present invention is generally designated by the reference numeral 140 and shown to include a tray 142 specifically adapted for use with a filter and impact valve arrangement which differs from that of FIGS. 1-3 in that the impact valve 116 is oriented with its valve shaft 130 on the opposite side of the flow path from that of the filter 114. The tray 142 of the second embodiment differs from the tray 42 of the first embodiment in that the side wall 150 does not include a lower, rear edge tab or flange (86 in FIG. 2) because the latch arm 118 does not require modification and, therefore, a "stop" is not required. In other words, installation of the device 140 does not necessitate shortening of the latch arm 118 since the trip pin 188 strikes and then moves past the latch arm 118 as the tray 142 moves to a filter accessing position. As such, the weight of the tray 142 is not supported by the latch arm 118 even though the end of the latch arm 118 contacts and is stopped by the valve shaft 130. The second embodiment also differs from the first embodiment in that the trip pin 188 has been fastened to side wall 150 rather than 148.

The third and fourth embodiments differ from the first and second embodiments in that they are adapted for use with dispensers having vertically oriented filter assemblies 290 and 390 each having filters 292 and 392, respectively. Hence, the third and fourth embodiments have different tray and attachment member structures, while retaining the same bracket and u-bolt assemblies as the first two embodiments.

Figure 6:
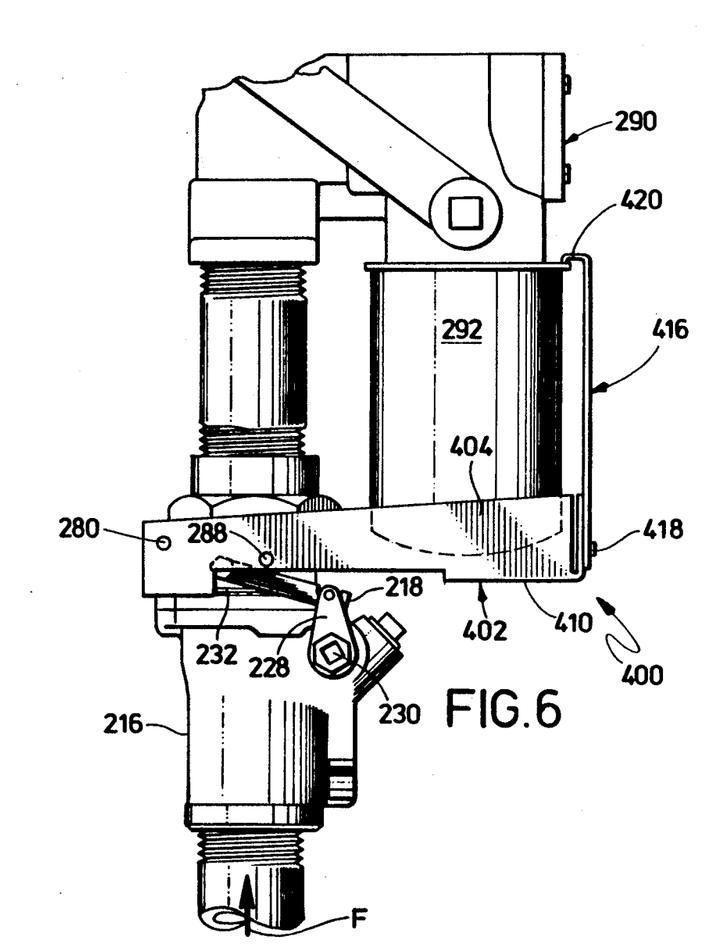
FIG. 6 is a side elevation representing a third embodiment of the safety interlock device of the present invention in a filter access obstructing position.
Figure 7:
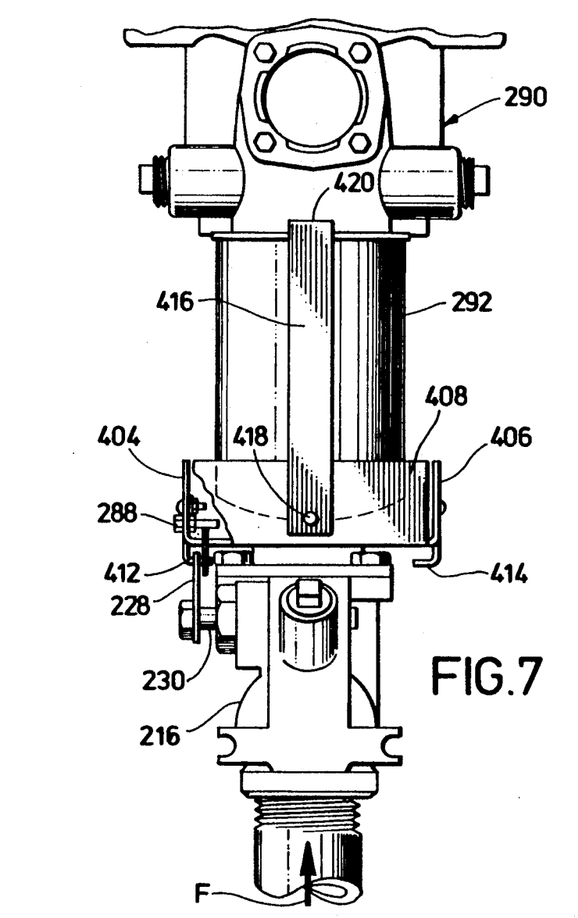
FIG. 7 is a fragmentary front elevation of the safety interlock device of FIG. 6.
Figure 8:
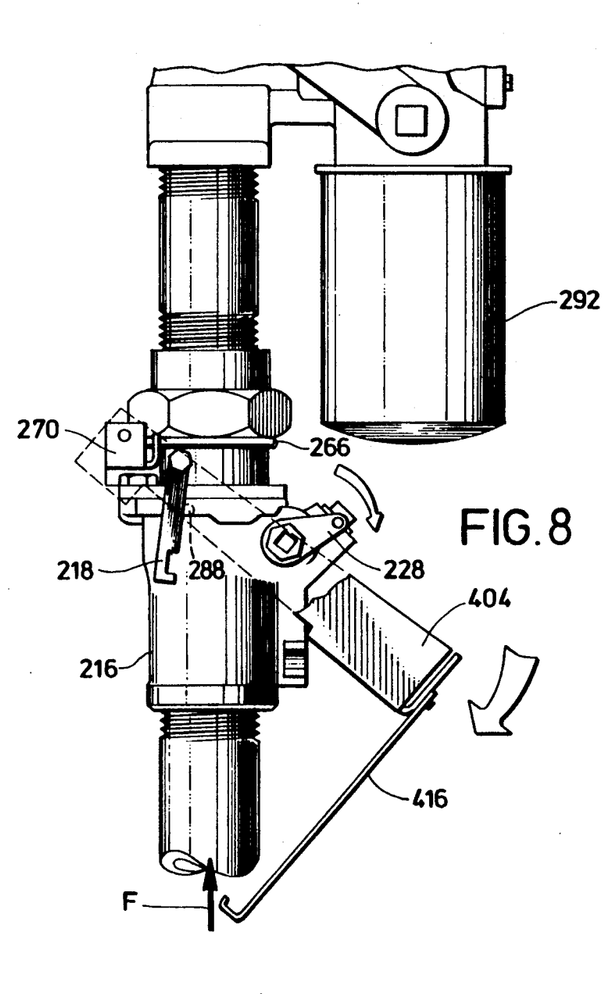
FIG. 8 is a side elevation of the safety interlock device of FIG. 6 in a filter accessing position.

As shown in FIGS. 6-8 of the drawings, the third embodiment of the safety interlock device of the present invention is generally designated by the reference numeral 400 and shown to include a tray 402 having tapered side walls 404 and 406, a front wall 408, and a web 410 partially interconnecting the side and front walls. The tray side walls 404 and 406 have tabs or flanges 412 and 414, respectively, extending inwardly from their lower, rear surface. The flange 412 serves as a stop for limiting the travel of the latch arm 218 when it is disengaged from the valve actuating arm 228.

The device 400 further includes a vertical filter attachment member 416 in the form of an elongate, hook-shaped member having a planar lower end pivotally attached to the tray 402 by a fastener element 418 and a hook or j-shaped upper end 420.

The device 400 is installed and operates in a similar fashion to the device 40 of FIGS. 1-3. Installation merely requires that the latch arm 218 be shortened so that the end of the latch arm will not catch on the valve shaft 230, the bracket 270 (FIG. 8) be attached to the upper neck of the impact valve 216, the trip screw 288 be tightly fastened to the tray wall 404, the attachment member 416 be loosely secured to the tray front wall 408 to allow for relative rotation between the attachment member and tray, the tray 402 be loosely attached to the bracket 270, the tray 402 be raised to cover the lower portion of the filter 292, the hook-shaped end 420 of the attachment member 416 be inserted in a recess in the top of the filter, and that the impact valve 216 be latched open.

To lower the tray 402 to the filter access or removal position shown in FIG. 8, one need only lift up on the tray 402 a sufficient amount to allow the hook-shaped portion 420 of the attachment member to be removed from the recess in the upper end of the filter 292 and then permit the tray 402 to rotate clockwise until the web 410 abuts with the lower portion of the impact valve 216.

Figure 9:
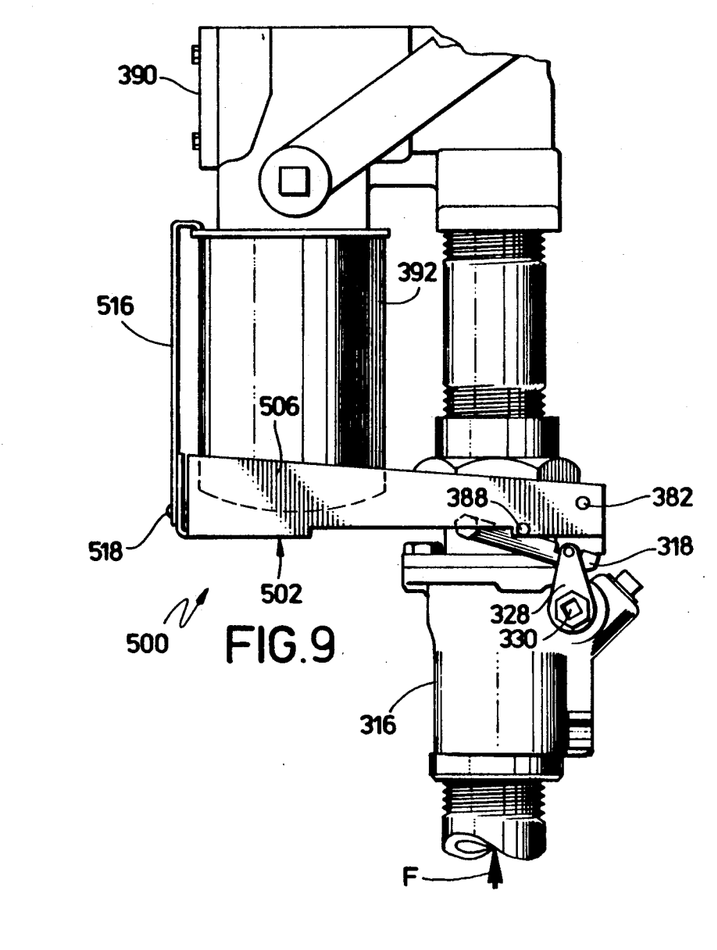
FIG. 9 is a side elevation illustrating a further embodiment of the safety interlock device of the present invention in a filter access blocking position.
Figure 10:
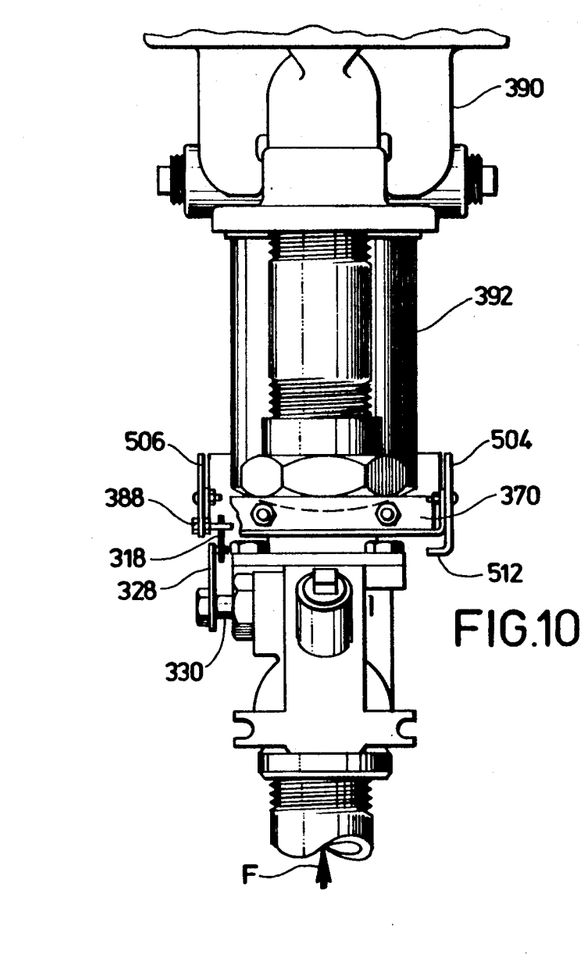
FIG. 10 is a fragmentary rear elevation of the safety interlock device of FIG. 9.

With reference to FIGS. 9 and 10 of the drawings, a fourth embodiment of the safety device of the present invention is generally designated by the reference numeral 500 and differs from the device 400 of FIGS. 6-8 in that the device 500 is adapted for use with a vertical filter and impact valve arrangement wherein the impact valve is oriented opposite to that shown in FIGS. 6-8 so that the valve shaft 330 is located on the opposite side of the fluid flow path from the filter 392. The attachment member 516 and bracket 370 of the fourth embodiment device 500 are identical to the third embodiment attachment member 416 and bracket 270 (FIGS. 6-8). The tray 502 differs from the tray 402 in that the sidewall 506 does not have a lower, rear edge flange (414, FIG. 7) because the latch arm 318 does not require modification and, therefore, a "stop" is not required.

The third and fourth embodiments also differ in that the trip pin or screw 388 is fastened in the sidewall 506 rather than the sidewall 504.

Thus, it will be appreciated that as a result of the present invention, a highly effective filter change liquid shutoff safety interlock device is provided and by which the stated objectives, among others, are completely fulfilled. It is contemplated that changes and/or modifications may be made in the illustrated embodiment without departure from the invention.

Accordingly, it is expressly intended that the foregoing description and accompanying drawings are illustrative of preferred embodiments only, not limiting, and that the true spirit and scope of the present invention be determined by reference to the appended claims.

What is claimed is:

1. A filter change liquid shutoff safety interlock device for use with an impact valve and an external filter arrangement such as found in a remote pump type dispensing system, said device comprising:
   tray means for blocking access to said filter, tray supporting means for contacting and thereby releasably attaching said tray to said filter,
   and trip means for closing said impact valve when said tray supporting means is moved out of contact with said filter and said tray means is moved away from said filter actuating said trip means to close said impact valve and permitting access to said filter.

2. The safety interlock device of claim 1, wherein said tray means for blocking access comprises a tray having a pair of opposing side walls, a front wall and a web at least partially interconnecting said side and front walls and wherein said side and front walls and said web define therebetween a substantially rectangular recess for receiving at least a portion of the end of said filter.

3. The safety interlock device of claim 2, wherein said tray supporting means for releasably attaching comprises an inverted u-shaped member pivotally mounted on said tray.

4. The safety interlock device of claim 2, wherein said tray supporting means for releasably attaching comprises an elongate, j-shaped member pivotally mounted on said tray.

5. The safety interlock device of claim 2, wherein said impact valve includes a latch arm for latching said impact valve open, and said trip means for closing said impact valve comprises a trip pin fastened to said tray.

6. The safety interlock device of claim 5, further comprising bracket means for rotatably supporting one end of said tray adjacent said impact valve.

7. The safety interlock device of claim 6, wherein said bracket means includes a u-bolt for fastening a bracket to the upper portion of said impact valve.

8. The safety interlock device for ensuring that the fluid flow to an external filter is stopped prior to filter removal, said device comprising:
   a tray like element having an opposing pair of side walls, a front wall, and a bottom wall at least partially interconnecting said side and front walls,
   an attachment member adapted to conduct said filter and pivotally fastened near one end of said tray for selectively placing said tray adjacent to an end of said filter,
   a bracket assembly pivotally mounted adjacent the other end of said tray and supporting said tray adjacent a fluid flow control valve,
   a trip pin fastened to one of said sidewalls of said tray for tripping said valve closed to stop fluid flow to said filter when said attachment member is moved out of contact with said filter and said tray like element is moved away from said filter actuating said trip means to close said impact valve and permitting access to said filter.

9. The safety interlock device of claim 8, wherein said filter is horizontally oriented and said attachment member comprises an inverted u-shaped member having side sections pivotally fastened to the side walls of said tray.

10. The safety interlock device of claim 8, wherein said filter is vertically oriented and said attachment member comprises an elongate, hook-shaped element having a planar end pivotally fastened to the front wall of said tray.

11. Method of installing a safety interlock device between an external filter and an impact valve in a remote pump type dispensing system, wherein said device includes a bracket, a u-bolt, a tray, a trip screw, an attachment member, and a plurality of fastener elements, said method comprising:
   fixedly attaching said bracket to said impact valve using said u-bolt;
   tightly fastening said trip screw to said tray,
   loosely fastening said attachment member to said tray to allow said attachment member to rotate relative to said tray, and
   loosely attaching said tray to said bracket to allow said tray to rotate relative to said bracket
   raising one end of said tray and placing a portion of said attachment member over said filter, and
   latching the impact valve open.

12. A safety kit for use with an external filter and impact valve arrangement in a remote pump type dispensing system to provide a safety feature of preventing access to said filter when said impact valve is open, said kit comprising:
   a bracket,
   a tray,
   an attachment member,
   a u-bolt,
   a pair of #10-32 lock nuts,
   at least three #8-32×½ screws,
   one #8-32×7/8 screw defining a trip pin, and
   at least four #8-32 hex nuts wherein in one position said tray blocks access to said filter and in another position provides filter access while having said trip pin cause said impact valve to close.

13. A filter change liquid shutoff safety interlock device for use with an impact valve and external filter arrangement such as found in a remote pump type dispensing system, said device comprising:
   tray means for blocking access to said filter, tray supporting means for contacting and thereby releasably attaching said tray to said filter,
   and trip means for closing said impact valve when said tray supporting means is moved out of contact with said filter and said tray means is moved away from said filter actuating said trip means to close said impact valve and permitting access to said filter,
   and wherein said tray means, trip means, and tray supporting means serve together as a means for closing said impact valve prior to removal of said filter and means for preventing latching open said impact valve while said filter is removed.

14. The safety interlock device of claim 13, wherein said tray means comprises a tray having a pair of opposing side walls, a front wall and a web at least partially interconnecting said side and front walls and wherein said side and front walls and said web define therebetween a recess for receiving at least a portion of the end of said filter.

15. The safety interlock device of claim 14, wherein said means for releasably attaching comprises an inverted u-shaped member pivotally mounted on said tray.

16. The safety interlock device of claim 14, wherein said means for releasably attaching comprises an elongate j-shaped member pivotally mounted on said tray.

17. Method of installing a safety interlock device between an external filter and an impact valve such as found in a remote pump type dispensing system, wherein said device includes a bracket, a u-bolt, a tray, a trip screw, an attachment member, and a plurality of fastener elements, and said impact valve includes a latch arm, said method comprising:

shortening said latch arm,
    attaching said bracket to said impact valve,
    fastening said trip screw to said tray,
    fastening said attachment member to said tray,
    attaching said tray to said bracket,
    placing a portion of the attachment member over said filter, and
    latching the impact valve open.

* * * * *

UNITED STATES PATENT AND TRADEMARK OFFICE
CERTIFICATE OF CORRECTION

PATENT NO. : 5,101,850
DATED : April 7, 1992
INVENTOR(S) : JOHN A. TODD

It is certified that error appears in the above—identified patent and that said Letters Patent is hereby corrected as shown below:

Column 7, line 55, change "conduct" to --contact--.

Signed and Sealed this

Twenty-second Day of June, 1993

Attest:

MICHAEL K. KIRK

Attesting Officer

Acting Commissioner of Patents and Trademarks